Sept. 14, 1965  H. W. HOFF, JR  3,205,712
PLASTIC GAUGE BEZEL
Filed July 22, 1963
Fig. 1
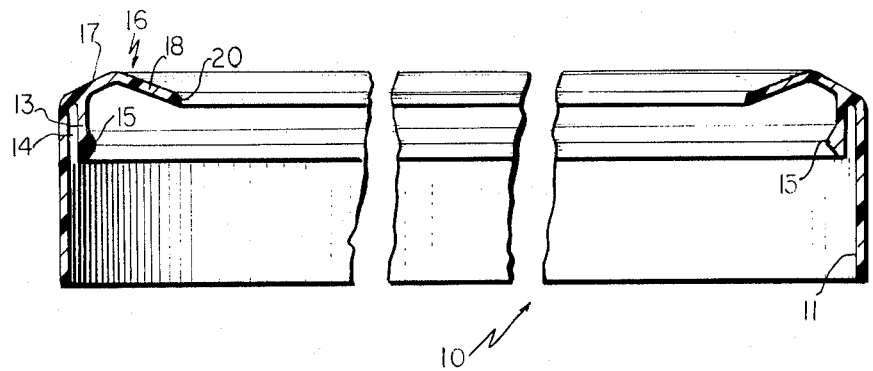
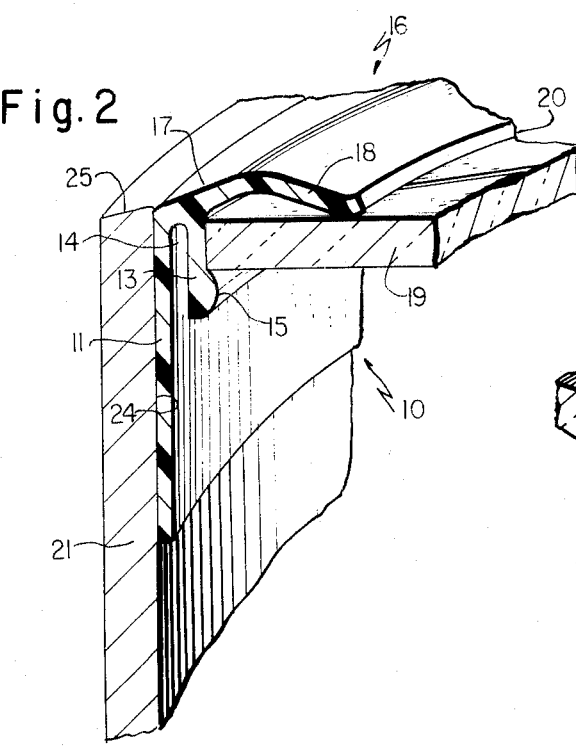
Fig. 2
Fig. 3
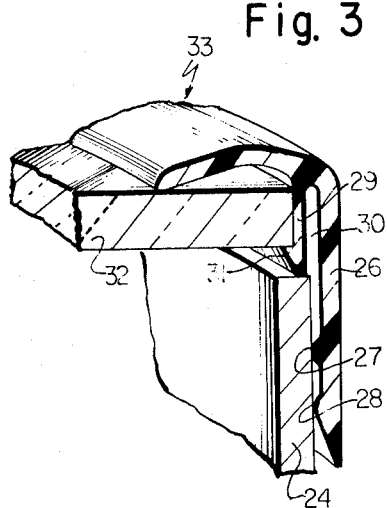
INVENTOR.
HARRY W. HOFF, JR.
BY
Robertson & Smythe
ATTORNEYS

United States Patent Office 3,205,712
Patented Sept. 14, 1965

3,205,712
PLASTIC GAUGE BEZEL
Harry W. Hoff, Jr., Quakertown, Pa., assignor to Ametek, Inc., New York, N.Y., a corporation of Delaware
Filed July 22, 1963, Ser. No. 296,578
2 Claims. (Cl. 73—431)

The present invention relates to gauges and particularly to an improved plastic bezel for gauges.

The principal object of the invention is to provide a plastic bezel for a gauge which has the capability of supporting a crystal for the gauge in a manner to exclude the entrance of moisture or dirt to the dial of the gauge.

Another object of the invention is to provide such a bezel which includes means for supporting a crystal in a manner to absorb any movements thereof caused by shock, particularly shock forces in the plane of the crystal.

Still another object of the invention is to provide such a plastic bezel which can easily be removed from the gauge casing in a minimum of time.

Another object of the invention is to provide such a plastic bezel that will accommodate oversized cyrstals.

Still another object of the invention is to provide a bezel of the above type which is made from a plastic such as polypropylene.

In one aspect of the invention, the bezel may comprise a first cylindrical skirt portion adapted snugly to engage the inside surface of the gauge casing to which it is to be applied.

In another aspect of the invention, a second skirt of less length than the first may be concentrically arranged relative to the first, and may be of a diameter so as to provide a space, channel or groove between the concentric skirt portions.

In still another aspect of the invention, the second skirt portion may include a radially inwardly extending bead portion adapted to support the crystal for the gauge and on which the crystal is adapted to seat.

In another aspect of the invention, the two skirt portions may be joined at their outer ends by an integral radially inwardly extending flange that is outwardly convex and inwardly concave to a degree that its inner peripheral edge resiliently urges the gauge crystal into seating relation with the bead on the second skirt.

In a still further aspect of the invention, the bezel preferably is made from a plastic such as polypropylene.

In another aspect of the invention, the bezel may comprise a first cylindrical skirt portion adapted snugly to engage the outside surface of the gauge casing to which it is applied. Spaced, peripherally extending bead means may surround the inner wall of said first cylindrical skirt means for sealingly engaging the outer wall of the gauge casing.

The above, other objects and novel features of the plastic bezel will become apparent from the following specification and accompanying drawing which are merely exemplary.

In the drawing:

FIG. 1 is a sectional view of a plastic bezel to which the principles of the invention have been applied;

FIG. 2 is an enlarged perspective view in section of a portion of a gauge and the bezel shown in FIG. 1, illustrating the mounting of a gauge crystal therein; and FIG. 3 is a sectional perspective view of a portion of a modified form of bezel.

Referring to the drawing, and particularly to FIG. 1, the principles of the invention are shown as applied to a bezel 10 including a first, outer skirt portion 11 which is shown as cylindrical. A second skirt portion 13 may be arranged concentrically with portion 11 and may be of a diameter so as to provide a channel or groove 14 between the skirt portions 11 and 13. The inner end of skirt 13 may be provided with a radially inwardly extending bead 15. The outer ends of skirt portions 11 and 13 may be joined together by a radially inwardly extending flange 16. Flange 16 may have an outwardly facing convex surface 17 and an inwardly facing concave surface 18, the construction being such that when a crystal 19 is seated on bead 15, the inner peripheral edge 20 of flange 16 resiliently retains the crystal seated against bead 15.

The skirt portion 13 is capable of pivotal movement about its outer end joined to flange 16, so that should the crystal 19 be oversized in its diameter, skirt portion 13 will easily accommodate it. Furthermore, with the radially inward spacing of the skirt portion 13 providing the channel 14 between it and skirt portion 11, any shock force applied to the gauge casing which might otherwise break the crystal 19 will be absorbed by the free movement of inner skirt portion 13.

Referring to FIG. 2, a portion 21 of a gauge casing is shown. It preferably is metal although the material from which it is fabricated is not critical. In the embodiment shown in FIG. 2, the outer surface of skirt portion 11 snugly engages the inner peripheral surface 24 of casing 21 so that no overlapping of the bezel 10 and the outer edge 25 of the casing occurs.

Referring to FIG. 3, the bezel is shown as comprising a first skirt 26 having peripherally extending, spaced beads 27, 28 that are adapted sealingly to engage the outer surface of the side wall 24 of the gauge casing. A second skirt portion 29 is shown as arranged concentrically with portion 26 and is also of a diameter to provide a channel 30 between the skirt portions 26 and 29. The inner or free end of skirt portion 29 is shown as including a shoulder 31 adapted to support a crystal 32. The outer ends of portions 26 and 29 are joined by a flanged element 33 similar to flanged element 16 of FIG. 2. Should the crystal 32 be oversized, the skirt portion 29 simply moves to its dotted line position.

While other plastics may be used, the physical and chemical characteristics of polypropylene make it ideally suited for the bezel 10.

Although the various features of the improved bezel have been shown and described in detail to fully disclose one embodiment of the invention, it will be evident that changes may be made in such details and certain features may be used without others without departing from the principles of the invention.

What is claimed is:

1. In a gauge having a casing with a side wall, a resilient plastic bezel for said casing adapted to support a crystal, said bezel including a first annular skirt portion adapted sealingly to fit a peripheral surface of the side wall of said casing; a second skirt portion concentric with, but spaced radially inwardly from, said first skirt portion, providing a channel between the two, a radially inwardly extending bead adjacent the inner end of said second skirt portion adapted to support said crystal; and radially inwardly extending flange means connecting the outer ends of said skirt portions and being curved and having an inner peripheral edge projecting inwardly beyond said second skirt portion, said edge being so arranged that when said crystal is in operative position said edge resiliently engages the outer face of said crystal and urges the crystal into seating contact with said bead.

2. In a gauge according to claim 1, wherein the inner surface of said first annular skirt portion includes inwardly extending bead means for sealingly engaging the outer surface of the cylindrical wall of said casing.

References Cited by the Examiner

UNITED STATES PATENTS

| 1,915,078 | 6/33 | Wallace | 58—91 |
| 2,134,093 | 10/38 | Ames | 73—431 |
| 2,256,200 | 9/41 | Heilman | 58—91 X |
| 2,477,705 | 8/49 | Sweet | 58—91 X |

RICHARD C. QUEISSER, *Primary Examiner.*